United States Patent
Noori et al.

(10) Patent No.: US 12,483,344 B2
(45) Date of Patent: Nov. 25, 2025

(54) SYSTEMS, METHODS, AND DEVICES FOR EARLY WILDFIRE DETECTION AND NETWORK PROTOCOL CONFIGURATION

(71) Applicant: SenseNet Inc., Vancouver (CA)

(72) Inventors: Hamed Noori, Vancouver (CA); Shahab Bahrami, Vancouver (CA)

(73) Assignee: SenseNet Inc., Vancouver (CA)

( * ) Notice: Subject to any disclaimer, the term of this patent is extended or adjusted under 35 U.S.C. 154(b) by 0 days.

(21) Appl. No.: 18/304,139

(22) Filed: Apr. 20, 2023

(65) Prior Publication Data

US 2023/0344538 A1 Oct. 26, 2023

Related U.S. Application Data

(60) Provisional application No. 63/333,095, filed on Apr. 20, 2022.

(51) Int. Cl.
*H04J 3/06* (2006.01)
*H04L 67/12* (2022.01)
(Continued)

(52) U.S. Cl.
CPC ............ *H04J 3/0638* (2013.01); *H04L 67/12* (2013.01); *H04W 4/38* (2018.02); *H04W 56/0015* (2013.01)

(58) Field of Classification Search
None
See application file for complete search history.

(56) References Cited

U.S. PATENT DOCUMENTS 9,070,268 B2   6/2015  Monacos et al.
10,042,086 B1  8/2018  Smalley
(Continued)

FOREIGN PATENT DOCUMENTS

CN  106781178 A   5/2017
CN  110517434 A  11/2019
(Continued)

OTHER PUBLICATIONS

Distefano et al., "A hypervisor for infrastructure-enabled sensing Clouds". 2013 (Year: 2013).*
(Continued)

*Primary Examiner* — Scott B Christensen
(74) *Attorney, Agent, or Firm* — Own Innovation Inc.; James W. Hinton; Daniel Biggs

(57) ABSTRACT

Provided are systems and methods for detection and network configuration. A system includes data processing devices and a server including a processor and a memory, the memory storing computer-executable instructions thereon that, when executed by the processor, cause the network configuration server to receive a plurality of synchronization and mapping messages from the plurality of data processing devices and the network gateway over a network for a predetermined period of time, determine a network architecture based upon the plurality of synchronization and mapping messages, the network architecture including a plurality of modes of operation of the plurality of data processing devices, a frequency channel for the plurality of data processing devices for transmission of environmental data, an optimization path, and an identity of a data processing device for transmission to another data processing device, and communicate the network architecture to the plurality of data processing devices over the network.

19 Claims, 9 Drawing Sheets

(51) Int. Cl.
  *H04W 4/38* (2018.01)
  *H04W 56/00* (2009.01)

(56) References Cited

U.S. PATENT DOCUMENTS

| | | | |
|---|---|---|---|
| 10,957,185 B2 | 3/2021 | Krstanovic et al. | |
| 11,295,131 B1 | 4/2022 | Dhawan et al. | |
| 11,521,479 B2 | 12/2022 | Shah et al. | |
| 11,627,436 B2 * | 4/2023 | Volkerink | H04W 4/70 320/136 |
| 2006/0176169 A1 * | 8/2006 | Doolin | G08B 31/00 340/521 |
| 2007/0206616 A1 * | 9/2007 | Orth | H04W 92/02 370/401 |
| 2013/0219046 A1 * | 8/2013 | Wetterwald | H04L 45/38 709/224 |
| 2015/0362172 A1 * | 12/2015 | Gabriel | F21V 11/16 348/151 |
| 2016/0132714 A1 | 5/2016 | Pennypacker et al. | |
| 2017/0100615 A1 | 4/2017 | Doten | |
| 2018/0093623 A1 * | 4/2018 | Terwilliger | H04L 67/12 |
| 2018/0184330 A1 * | 6/2018 | Egner | H04L 43/065 |
| 2018/0184360 A1 | 6/2018 | Cavalcanti et al. | |
| 2018/0199172 A1 | 7/2018 | Boily et al. | |
| 2019/0104519 A1 * | 4/2019 | Sydir | H04L 41/12 |
| 2019/0277822 A1 | 9/2019 | Chadha et al. | |
| 2020/0025629 A1 * | 1/2020 | Zinger | H04L 12/2829 |
| 2020/0187488 A1 | 6/2020 | Holmberg et al. | |
| 2020/0236607 A1 * | 7/2020 | Zhu | H04W 24/08 |
| 2020/0242916 A1 | 7/2020 | Krstanovic et al. | |
| 2020/0348446 A1 | 11/2020 | Tremsin | |
| 2021/0097850 A1 | 4/2021 | Ton-That et al. | |
| 2021/0337425 A1 * | 10/2021 | Wintner | H04L 12/2856 |
| 2021/0398417 A1 | 12/2021 | Maheshwari et al. | |
| 2022/0104123 A1 * | 3/2022 | Heeger | H04W 12/106 |
| 2022/0161075 A1 | 5/2022 | Snook et al. | |
| 2022/0276080 A1 | 9/2022 | Deutsch et al. | |
| 2022/0294715 A1 * | 9/2022 | Agrawal | H04L 43/04 |
| 2022/0297721 A1 | 9/2022 | Xiao | |
| 2022/0398840 A1 | 12/2022 | Dhawan et al. | |

FOREIGN PATENT DOCUMENTS

| | | |
|---|---|---|
| KR | 20100029485 A | 3/2010 |
| WO | 2016132161 A1 | 8/2016 |
| WO | 2018103213 | 6/2018 |
| WO | 2021194849 A1 | 9/2021 |

OTHER PUBLICATIONS

"Optical Bandpass Filter Fundamentals," posted on Aug. 15, 2020 at < https://www.andovercorp.com/technical/White-papers/What-are-the-bandpass-fundamentals-/> (Year: 2020).*

Sferopoulos. "A Review of Chemical Warfare Agent (CWA) Detector Technologies and Commercial-Off-The-Shelf Items," published Mar. 2009 (Year: 2009).*

* cited by examiner

SYSTEMS, METHODS, AND DEVICES FOR EARLY WILDFIRE DETECTION AND NETWORK PROTOCOL CONFIGURATION

TECHNICAL FIELD

The following relates generally to wildfire detection, and more particularly to systems, methods, and devices for early detection and monitoring of wildfires and wildfire network protocol configuration.

INTRODUCTION

Wildfires pose numerous dangers to human life, to the environment, and to property. Wildfires may be deadly for both humans and animals alike. Wildfires present particular risks of people becoming trapped by rapidly moving flames or succumbing to smoke inhalation and wildlife not being able to escape or find suitable habitats thereafter. Wildfires may cause extensive damage to residential and commercial properties, infrastructure, and agricultural lands, resulting in significant financial losses for individuals, businesses, and governments.

Significant environmental devastation may also result from wildfires. Such devastation includes damage to forests, grasslands, and other ecosystems due to the loss of vegetation. Such loss of vegetation leads to soil erosion, reduced water quality, and an increased risk for landslides and flooding in affected areas. Smoke from wildfires may significantly reduce air quality, leading to respiratory problems and other health concerns for people and animals alike. Fine particulate matter ($PM_{2.5}$) and other pollutants are able to travel long distances, impacting air quality even far away from where wildfires have occurred. Furthermore, wildfires release large amounts of carbon dioxide ($CO_2$) and other greenhouse gases into the atmosphere, contributing to climate change.

Early wildfire detection is essential as a means of preserving human life and protecting the environment by allowing for quicker responses and better management of wildfires. Early detection of wildfires allows firefighting crews to act more quickly, potentially responding to a wildfire before the wildfire spreads out of control. Such response helps minimize overall damage to human life, to the environment, and to property. Furthermore, firefighting authorities may be able to allocate resources more effectively to where they are most needed. Such allocation may result in a more efficient use of personnel, equipment and financial resources and may help preserve human life.

Fighting wildfires before they spread may advantageously help defray overall firefighting expenses, as smaller fires tend to be less expensive and resource-intensive to extinguish than larger, out-of-control wildfires. When wildfires are detected early, authorities have more time to issue evacuation orders and guarantee residents in affected areas are safely evacuated. This additional time advantageously mitigates injuries and fatalities by giving people enough time to prepare and leave their homes safely. Furthermore, early detection allows for faster alerts about air quality and smoke-related health hazards. Such faster alerts may help individuals with respiratory conditions such as asthma or other lung diseases take precautions and minimize exposure to hazardous pollutants. Moreover, early detection may facilitate protecting critical infrastructure such as power lines, roads, and communication networks, decreasing the likelihood of widespread service disruptions and repairs that would incur costs. Early detection may further lead to faster containment, advantageously minimizing the environmental effects of wildfires such as soil erosion, water pollution, and loss of biodiversity.

A variety of wildfire detection systems are known and utilized to detect and monitor wildfires. Presently, networks of ground-based sensors installed in fire-prone areas may detect changes in smoke or temperature indicators that might indicate the presence of a fire. Known ground-based sensors for stationary wildfire surveillance systems have limitations including limited coverage for star topologies, significant power consumption, and limited scalability. Expanding the coverage of stationary systems, particularly of star topologies, can be costly and time-consuming, as such expansion requires the installation of additional sensors, cameras, or towers. Furthermore, stationary systems may have difficulty detecting fires with certain characteristics, such as low-intensity fires, fires beneath tree canopies, or fires in areas with highly variable temperatures.

Moreover, the network protocols and sensor topologies used by known ground-based sensors, such as star topologies, consume significant power, thereby leading to costly maintenance. Network protocols such as Wi-Fi™, Bluetooth™ 3G/4G/5G Cellular Networks, and Ethernet™ consume high power due to higher transmission power and complex protocol overhead.

For ground-based sensors, star or mesh network topologies may be used. In a star network topology, all nodes (devices) are connected to a central hub or switch. The central hub manages the connections and communication between nodes. Data transmitted by a node must pass through the central hub or switch before reaching its destination. However, dependence on the central hub adds limitations to the star network topology. The limitations include reduced scalability, higher failure risk to the network if the central hub fails, i.e., a single point of failure, and higher cost. Comparatively, in the mesh network topology, the nodes are interconnected, with each node potentially having multiple connections to other nodes. Data may be transmitted along multiple paths, providing redundancy and fault tolerance. However, known systems for wildfire detection organized according to a mesh topology consume significant power as the antenna of each sensor stays active a large number of connections between nodes.

Further, networks may suffer from poor performance due to multiple device congestion, insufficient bandwidth, latency, packet loss, and other factors that may negatively impact the user experience. Such poor performance may result in slow data transfer, dropped connections, and delays that significantly affect productivity and user satisfaction. Networks that are not in synchronization may be more vulnerable to security threats such as hacking, malware, and data breaches because different devices or components may have different security settings or software versions, leaving the network vulnerable to attack.

Satellites, aerial imaging methods, and stationary surveillance methods may be used to scan very large areas of land but may not detect flames at early stages unless in a direct line of sight and may not be able to recognize early-stage wildfires at all. In particular, satellite-based systems for wildfire detection rely on orbits of satellites for coverage, which may cause gaps in coverage or delays in data acquisition for certain areas. Moreover, aerial systems relying on flying vehicles, such as drones, may be temporally limited, as drones and like devices have limited flight durations.

Accordingly, networks, methods, and devices are desired that overcome one or more disadvantages associated with existing wildfire detection and monitoring and network protocol configuration systems.

Summary

A detection and network configuration system is provided, the system including a plurality of data processing devices and a network configuration server, the network configuration server including a processor and a memory communicatively connected with the at least one processor, the memory storing computer-executable instructions thereon that, when executed by the processor, cause the network configuration server to receive a plurality of synchronization and mapping messages from the plurality of data processing devices and the network gateway over a network for a predetermined period of time, determine a network architecture based upon the plurality of synchronization and mapping messages, the network architecture including a plurality of modes of operation of the plurality of data processing devices a frequency channel for the plurality of data processing devices for transmission of environmental data, an optimization path, and an identity of each data processing device for transmission to each other data processing device, and communicate the network architecture to the plurality of data processing devices over the network.

Each data processing device may automatically select a network protocol from a plurality of network protocols based on a location of the data processing device and/or a received network protocol received from another data processing device.

The system may further include at least one network gateway configured to provide a communication interoperability interface between the plurality of network protocols and a network server for providing network services including data processing, storage, application and device management, and resource sharing, the network server connected to the at least one network gateway. The plurality of network protocols may include any one or more of a LoRa (Long Range) network protocol and a LoRaWAN (Long Range Wide Area Network) network protocol. The environmental data may relate to the presence or absence of a wildfire.

The plurality of data processing devices and the at least one network gateway may be configured to transmit data in a time synchronization, the time synchronization including any one or more of duty cycling, time-slotted communication, coordinated sensing, power-efficient routing, and reduced idle listening.

The data processing device may include a sensor assembly. The sensor assembly may include a plurality of sensors configured to detect the environmental data, the environmental data relating to any one or more of carbon dioxide, carbon monoxide, nitrogen dioxide, temperature, and humidity. The sensor assembly may further include a filter configured to improve measurement accuracy, the filter configured as any one or more of a bandpass filter, a neutral density filter, a chemical filter, and a particulate filter.

The data processing device may include a wireless communication module. The wireless communication module may be configured to operate in any one of a plurality of operation modes including a LoRa end-node, a LoRaWAN end-node, a LoRa repeater mode, and a LoRa to LoRaWAN mode based on the received network protocol of the other data processing device.

Each data processing device may include a power supply assembly configured to provide electrical power to the data processing device, the power supply assembly including a power source and a power management circuit. The power source may include a rechargeable battery and a non-rechargeable battery. The rechargeable battery may serve as a first power source until an energy level of the rechargeable battery reaches a predetermined limit according to the power management circuit, and the non-rechargeable battery may serve as a second power source when the energy level is at the predetermined limit.

A detection and network configuration method is provided, the method including receiving a plurality of synchronization and mapping messages from a plurality of data processing devices and network gateways over a network for a predetermined period of time, determining a network architecture based upon the plurality of synchronization and mapping messages, the network architecture including a plurality of modes of operation of the respective data processing devices, a frequency channel for the plurality of data processing devices for transmission of environmental data, an optimization path, and an identity of the respective data processing devices for transmission to a plurality of other data processing devices, and communicating the network architecture to the plurality of data processing devices over the network.

The method may further include automatically selecting the network protocol from a plurality of network protocols based on a location of the data processing device and/or a received network protocol received from another data processing device.

The method may further include providing, by at least one network gateway, a communication interoperability interface between the plurality of network protocols. The plurality of network protocols may include any one or more of a LoRa (Long Range) network protocol and a LoRaWAN (Long Range Wide Area Network) network protocol. The environmental data may relate to the presence or absence of a wildfire.

The method further may further include transmitting data in a time synchronization by the plurality of data processing devices and a plurality of network gateways. The time synchronization may include any one or more of duty cycling, time-slotted communication, coordinated sensing, power-efficient routing, and reduced idle listening.

The data processing device may include a sensor assembly. The sensor assembly may include a plurality of sensors configured to detect the environmental data, the environmental data relating to any one or more of carbon dioxide, carbon monoxide, nitrogen dioxide, temperature, and humidity. The sensor assembly may include a filter configured to improve measurement accuracy, the filter configured as any one or more of a bandpass filter, a neutral density filter, a chemical filter, and a particulate filter. The data processing device may further include a power supply assembly configured to provide electrical power to the data processing device, the power supply assembly including a power source and a power management circuit. The power source may include a rechargeable battery and a non-rechargeable battery. The rechargeable battery may serve as a first power source until an energy level of the rechargeable battery reaches a predetermined limit according to the power management circuit, and the non-rechargeable battery may serve as a second power source when the energy level is at the predetermined limit.

The data processing device may include a wireless communication module. The wireless communication module may be configured to operate in any one of a plurality of operation modes including a LoRa end-node, a LoRaWAN end-node, a LoRa repeater mode, and a LoRa to LoRaWAN mode based on the received network protocol of the other data processing device.

A detection and network configuration system is provided, the system including a plurality of client systems, a plurality of data processing devices and a network configuration server communicatively connected to the plurality of client systems and the plurality of data processing devices, the network configuration server including a hypervisor configured to supervise a plurality of virtual machines and merge environmental data from the plurality of data processing devices, a hardware layer, an infrastructure layer configured to provide infrastructure as a service (IaaS), a platform layer configured to provide platform as a service (PaaS), and an application layer configured to provide access to an application software.

The detection and network configuration system of claim 14, wherein the network configuration server may further include a processor and a memory communicatively connected with the at least one processor, the memory storing computer-executable instructions thereon that, when executed by the processor, cause the network configuration server to receive a plurality of synchronization and mapping messages from the plurality of data processing devices and the network gateway over a network fora predetermined period of time, determine a network architecture based upon the plurality of synchronization and mapping messages, the network architecture including a plurality of modes of operation of the plurality of data processing devices, a frequency channel for the plurality of data processing devices for transmission of environmental data, an optimization path, and an identity of each data processing device for transmission to each other data processing device, and communicate the network architecture to the plurality of data processing devices over the network.

Each data processing device may automatically select a network protocol from a plurality of network protocols based on a location of the data processing device and/or a received network protocol received from another data processing device.

The system may further include at least one network gateway configured to provide a communication interoperability interface between the plurality of network protocols and a network server for providing network services including data processing, storage, application and device management, and resource sharing, the network server connected to the at least one network gateway. The plurality of network protocols may include any one or more of a LoRa (Long Range) network protocol and a LoRaWAN (Long Range Wide Area Network) network protocol. The environmental data may relate to the presence or absence of a wildfire.

The plurality of data processing devices and the at least one network gateway may be configured to transmit data in a time synchronization, the time synchronization including any one or more of duty cycling, time-slotted communication, coordinated sensing, power-efficient routing, and reduced idle listening.

The data processing device may include a sensor assembly. The sensor assembly may include a plurality of sensors configured to detect the environmental data, the environmental data relating to any one or more of carbon dioxide, carbon monoxide, nitrogen dioxide, temperature, and humidity. The sensor assembly may include a filter configured to improve measurement accuracy, the filter configured as any one or more of a bandpass filter, a neutral density filter, a chemical filter, and a particulate filter. The data processing device may include a power supply assembly configured to provide electrical power to the data processing device, the power supply assembly including a power source and a power management circuit. The power source may include a rechargeable battery and a non-rechargeable battery. The rechargeable battery may serve as a first power source until an energy level of the rechargeable battery reaches a predetermined limit according to the power management circuit, and the non-rechargeable battery may serve as a second power source when the energy level is at the predetermined limit.

The data processing device may include a wireless communication module. The wireless communication module may be configured to operate in any one of a plurality of operation modes including a LoRa end-node, a LoRaWAN end-node, a LoRa repeater mode, and a LoRa to LoRaWAN mode based on the received network protocol of the other data processing device.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of systems, methods, and devices of the present specification. In the drawings.

DETAILED DESCRIPTION

Figure 1:
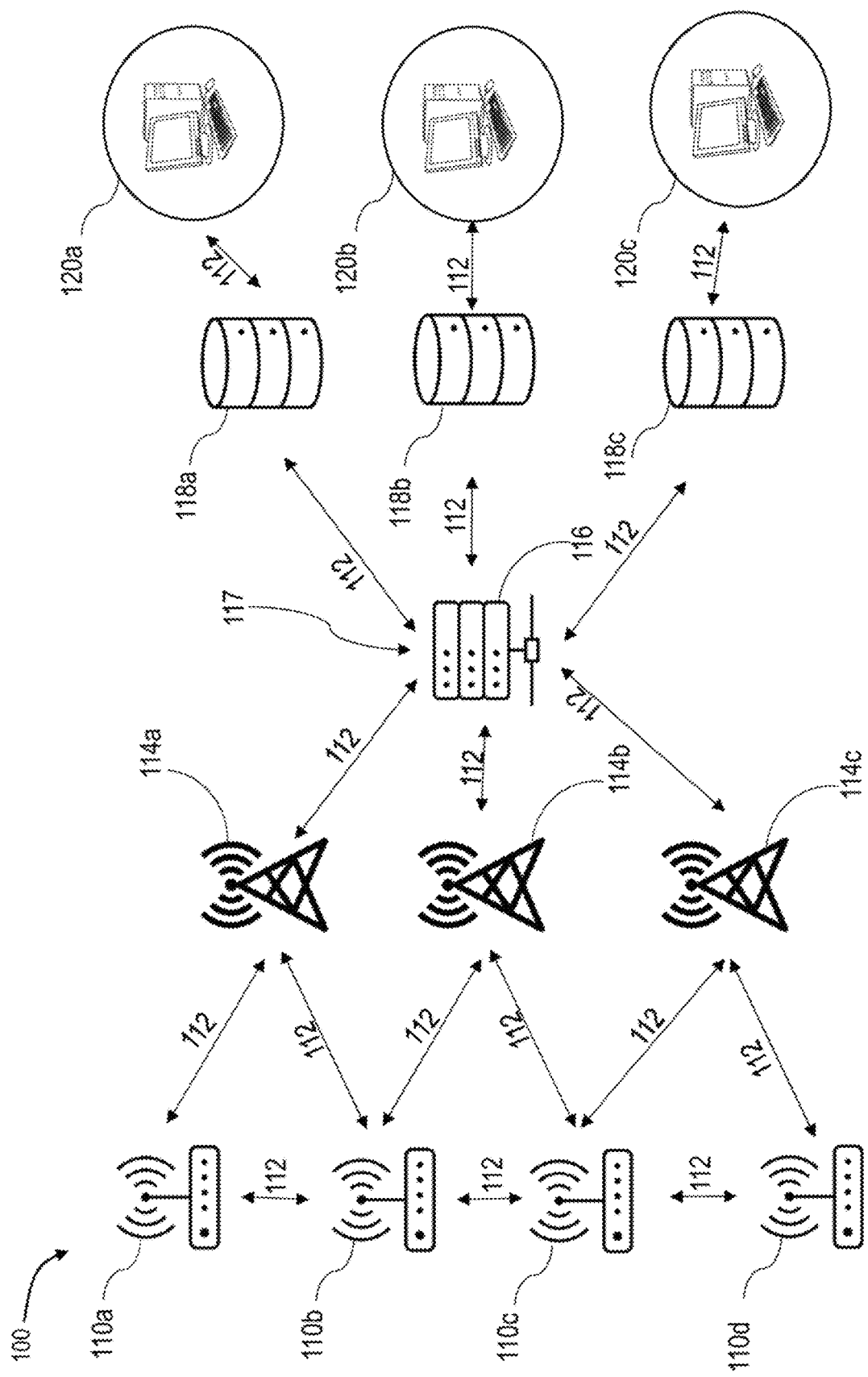
FIG. 1 is a schematic diagram illustrating a system for early detection and monitoring of wildfires, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, personal computer, cloud-based program or system, laptop, personal data assistant, cellular telephone, smartphone, or tablet device.

Each program is preferably implemented in a high-level procedural or object-oriented programming and/or scripting language to communicate with a computer system. However, the programs may be implemented in assembly or machine language, if desired. In any case, the language may be a compiled or interpreted language. Each such computer program is preferably stored on a storage medium or a device readable by a general—or special-purpose programmable computer for configuring and operating the computer when the storage medium or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms, or the like may be described (in the disclosure and/or in the claims) in a sequential order, such processes, methods, and algorithms may be configured to work in alternate orders. Accordingly, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device or article.

The following relates generally to wildfire detection, and more particularly to systems, methods, and devices for early detection and monitoring of wildfires.

Wildfire detection systems are essential tools for forest and wildlife management agencies. Early detection and containment of wildfires advantageously minimizes damage to ecosystems and protects endangered species. Early wildfire detection systems are designed to identify and pinpoint the location of wildfires in their early stages, before wildfires become too large and uncontrollable. By recognizing wildfires at an early stage, early wildfire detection systems provide invaluable data to firefighters and emergency response units so that they can act swiftly and decisively.

Early detection of wildfires also helps maximize resource allocation for firefighting operations, enabling authorities to prioritize their response and deploy personnel and equipment strategically. Such allocation ensures that efforts are focused on the most critical areas, preventing the spread of wildfires and minimizing overall costs associated with suppression efforts.

Furthermore, early wildfire detection systems are essential in safeguarding public health by issuing timely alerts about air quality and smoke-related health hazards. This information allows those with respiratory conditions to take necessary precautions to reduce their exposure to hazardous air pollutants. Moreover, these systems provide invaluable data to researchers and fire management agencies to better comprehend wildfire behavior, create more efficient firefighting tactics, and enhancing prevention measures. As such, early wildfire detection systems play a pivotal role in helping minimize damage caused by wildfires while safeguarding environments, communities, and vital infrastructure for present and future generations. Paramount among the advantages of early wildfire detection systems, methods, and devices according to the present invention is the increased preservation of human life.

Referring now to FIG. 1, shown therein is a schematic diagram illustrating a system 100 for early detection and monitoring of wildfires, according to an embodiment.

The system 100 includes a plurality of data processing devices 110a, 110b, 110c, and 110d (collectively referred to as the data processing devices 110 and generically referred to as the data processing device 110), a network 112 to provide communication between the components of the system 100, a plurality of network gateways 114a, 114b, 114c (collectively referred to as the network gateways 114 and generically referred to as the network gateway 114) to provide an interface and network services between different network protocols and technologies, a network server 116 to provide network services including data processing, storage, application and device management, and resource sharing, a plurality of application servers 118a, 118b, 118c (collectively referred to as the application servers 118 and generically referred to as the application server 118), a plurality of terminals 120a, 120b, 120c (collectively referred to as the terminals 120 and generically referred to as the terminal 120) for running wildfire detection applications, and a processing station 117 (not shown) for providing data services.

The data processing devices 110 may be connected to one another through the network gateways 114 or the network 112 to transmit data. The data processing devices 110 may be further connected to the network server 116 through the network gateways 114 to provide data transmission and interoperability between different network protocols of devices.

The network 112 may be configured as a wired, wireless, or hybrid (partially wired and wireless) network based on a type of communication links used for connecting devices. The wired network 112 may include physical cables, such as Ethernet™ cables, to connect components in the system 100. The wireless network 112 may include Wi-Fi™, Wi-Max™, radio-frequency identification (RFID), or Bluetooth™ functionality to connect components in the system 100. The hybrid network may include a combination of wired and wireless networks. Ethernet™ connections may be made between switches and routers (not shown) to provide wireless connections between the terminals 120 using wireless connections. The network 112 may be deployed on a cloud computing architecture to monitor environmental data.

The network 112 may be a Low Power Wide Area Network (LPN) configured to include multiple network protocols such as LoRa and/or LoRaWAN protocols. A LoRa protocol is a network protocol that utilizes low-power and long-range wireless technology within a wireless spectrum. A LoRaWAN protocol is an open, cloud-based protocol that enables devices to communicate wirelessly with LoRa. The LoRaWAN protocol uses a LoRa modulation technique to enable low data rate communication over long distances while minimizing power consumption.

The network gateways 114 may be configured to provide communication between networks or devices with different protocols, for example between the network 112 and the data processing device 110a when the former is using the LoRa protocol and the latter is using the LoRaWAN protocol. The network gateway 114 may provide protocol conversion service, allowing networks 112 with different architectures and communication standards to connect and transmit data. The network gateway 114 may be configured to translate and convert data between different network protocols, such as LoRa and LoRaWAN. Furthermore, the network gateway 114 may be configured to perform address translation (for example, Network Address Translation (NAT) service, data filtering and security, and routing and traffic management).

The network gateways 114 may provide a communication link between wireless communication modules in the data processing devices 110 and the processing station 117. Furthermore, the network gateways 114 may provide data processing such as filtering, compression or validation to optimize data transmission.

The plurality of low-power data processing devices 110 configured for ultra-early wildfire detection. In an embodiment, a communication protocol for data processing devices in a large-scale remote mesh network configuration is provided.

Figure 5:
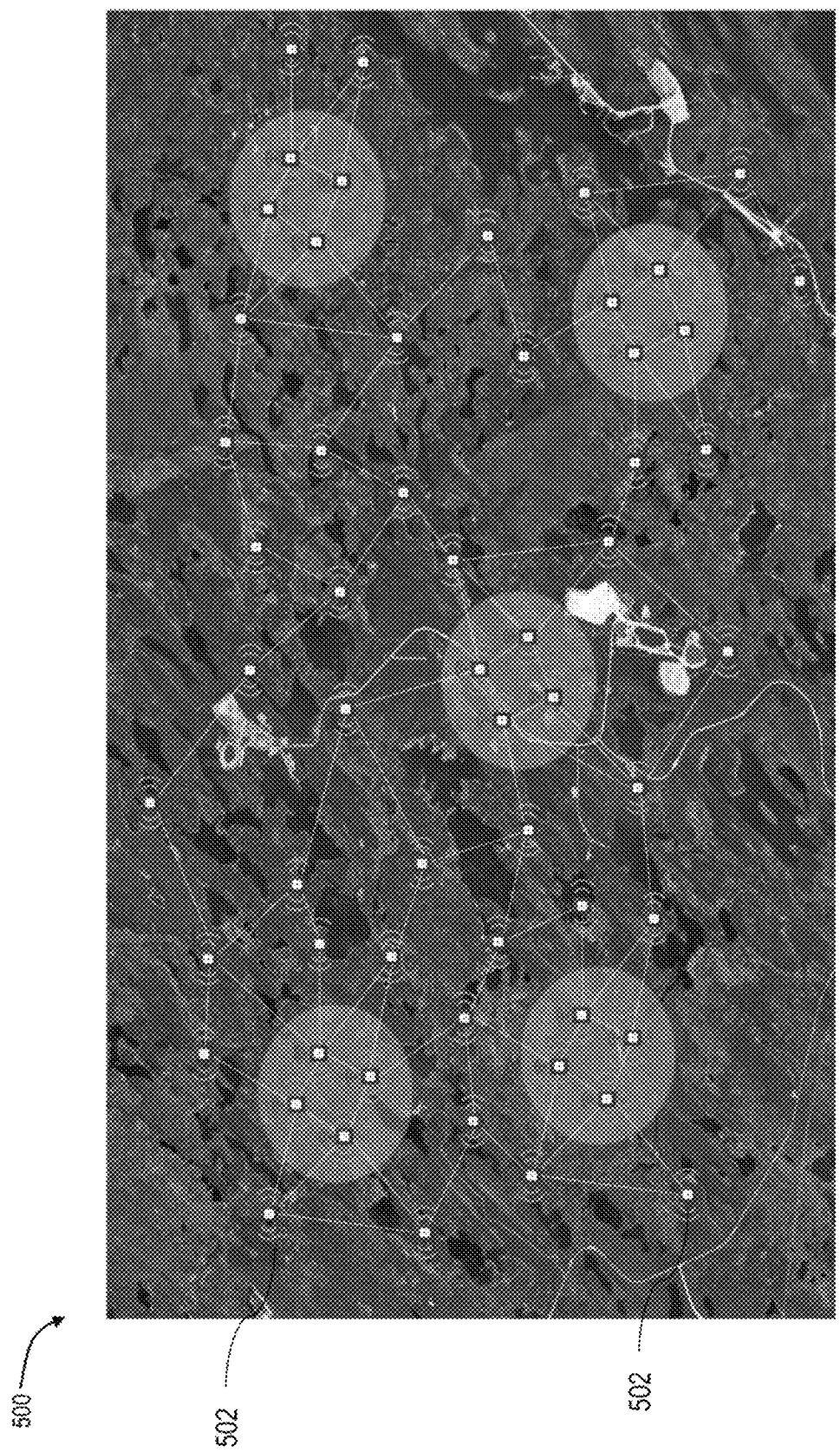
FIG. 5 is a top view of a system for early wildfire detection in deployment, according to an embodiment.

The data processing devices 110 are organized or arranged according to a mesh topology (see FIG. 5). Advantageously, the mesh network topology provides higher resilience, decentralization, and scalability. In event of a failure or damage to one device 110, data may be transmitted to the gateway 114 through alternative paths. Such data may include environmental data, i.e., data sensed by a device with respect to the external environment about the device. Further, additional data processing devices 110 may be added to the system 100 without significant network reconfiguration. According to an embodiment, the data processing devices 110 are optimized for reduced power consumption through time synchronization techniques. Techniques including duty cycling, time-slotted communication, coordinated sensing, power-efficient routing, and reduced idle listening may be used. The data processing devices 110 are configured to activate data collection, reception, and transmission at predefined time schedules, and alternatively enter low-power inactive modes. Furthermore, the data processing device 110 may be synchronized with other devices 110 to provide coordinated sensing and power-efficient routing.

According to an embodiment, each data processing device 110 connects to at least one other data processing device 110. The data processing devices 110 may be connected to other data processing devices 110 through the network gateways 114 or directly. In an embodiment, each data processing device 110 is connected to at least one other data processing device 110. The data processing devices 110 may each connect to the network server 116 through the network gateways 114. Because each data processing device 110 connects to some or all of the other data processing devices 110 and because at least some of the data processing devices 110 connect to the network gateway 114, data from each data processing device 110 is able to be sent to the network gateway 114, whether directly (i.e., through direct transmission between the data processing device 110 and the network gateway 114 through the network 112) or indirectly (e.g., from a further data processing device 110 through the network to the data processing device 110a to the network gateway 114a through the network 112).

According to an embodiment, each data processing device 110 transmits environmental data to one or more other data processing devices 110 over the network 112. The data processing device 110 may receive additional environmental data from the other data processing devices 110 over the network 112. The low-power processing module in the data processing device 110 may be configured to merge the environmental data with the additional environmental data to form merged environmental data for transmitting over the network 112.

In an embodiment, the data processing device 110 directly senses environmental data and further receives environmental data sensed by the other device 110. Thereafter, the device 110 may transmit the directly sensed environmental data and the received environmental data to the network 112. The foregoing process may be repeated until the collection of environmental data sensed by the plurality of data processing devices 110 is delivered to the network gateway 114. Various network protocols may be used to transmit data within or from the data processing devices 110. Preferably, low-powered network protocols including LoRa and LoRaWAN are used for transmission of the environmental data. In an embodiment, the merged environmental data includes environmental data as received from the other data processing devices 110.

The environmental data may relate to the presence or absence of wildfire in the vicinity of the data processing device 110. The environmental data may be processed within the data processing device 110. Thereafter, the processed environmental data may be transmitted over the network 112. The data processing device 110 may transmit the environmental data over the network 112. The data collection may receive related data, information, or instructions from the network 112.

The data processing device 110 includes a plurality of sensors for collecting the environmental data and a filter for protecting the plurality of sensors. The plurality of sensors may be grouped in the sensor assembly within the data processing device. The sensors may be configured as low-power data processing devices for ultra-early wildfire detection. The sensors may detect environmental conditions, such as the presence/absence of elements associated with fire such as carbon dioxide, carbon monoxide, nitrogen dioxide, temperature, and/or humidity. In an embodiment, the filter is removeable.

The data processing device 110 is configured to operate on a plurality of modes of operation or data transmission or network protocols. The wireless communication module may be configured to provide multiple modes of operation or data transmission or network protocols. The plurality of modes of operation may include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The data processing device 110 may select the mode of operation or data transmission based on the location of the device 110 in the network 112. The data processing device 110 may automatically select the mode based on the protocol through which data is received. For example, a LoRa mode may be selected on receiving a LoRa message or a LoRaWAN mode may be selected on receiving a LoRaWAN message.

According to an embodiment, the network gateways 114 may be configured as a LoRaWAN gateway 114. Where one of the data processing devices 110 receives only a LoRaWAN message from a LoRaWAN gateway 114 (i.e., has a direct connection to the gateway 114), the data processing device 110 selects a mode corresponding to a LoRaWAN end-node mode. Similarly, the data processing device may select the LoRaWAN end-node mode on receiving a LoRaWAN message from a neighboring data processing device. In the LoRaWAN end-node mode, the data processing device 110 collects sensor data from sensors (not shown) within the data processing device 110 for transmission over the network 112 via a further LoRaWAN message.

If the data processing device 110a receives a LoRaWAN message from a LoRaWAN Gateway and further receives a LoRa message from the data processing device 110b, the data processing device 110a selects a LoRa to LoRaWAN mode. In the LoRa to LoRaWAN mode, the data processing device 110a receives data from the data processing device 110b via LoRa messages (i.e., receives data collected by the sensors of the data processing device 110b) and merges data from the sensors of the data processing device 110a with the received data from the data processing device 110b for transmission over the network 112 in the LoRaWAN protocol to be received by the gateway 114. Merging the data may include aggregating the data of the device 110a with the device 110b without altering or compressing the data of the device 110a or the data of the device 110b. Merging the data may include pre-processing, altering, compressing, or post-processing the data of the device 110a or the data of the device 110b.

If the data processing device 110 receives only LoRa messages from other devices 110, the data processing device 110 selects a LoRa repeater mode. In the LoRa repeater mode, the data processing device 110 receives data from the other devices 110 via LoRa messages (i.e., receives data collected by the sensors of the other data processing devices 110) and merges data from the sensors of the other devices 110 with data from sensors of the device 110 for transmission via LoRa messages over the network 112.

If one of the data processing devices 110 is located at an end of the network 112 away from any network gateway 114, then the data processing device 110 may transmit data from its own sensors over LoRa messages to one or more other data processing devices 110. Further, if the data processing device does not need to repeat the environmental data and does not have direct access to any LoRaWAN Gateway 114, then the data processing device 110 may transmit data from its own sensors over LoRa messages to one or more other data processing devices 110.

The processing station 117 may be integrated in the network server 116 as shown in FIG. 1. The processing station 117 provides data services including sending, receiving, analyzing, and processing data received from the network gateways 114. The processing station 117 may perform advanced data processing techniques including machine learning algorithms and data fusion to detect and verify wildfire incidents. When the processing station 117 confirms that a wildfire has occurred, the processing station 117 generates alerts and notifications for relevant authorities to respond promptly and effectively to the incident.

The network server 116 may be a cloud server connected to a wide area network 112. The cloud server 116 may include different layers for different purposes. The different layers may include a hardware layer and/or a platform layer. The network 112 may be configured to connect to and supervise virtual machines and client systems.

The processing station 117 may be connected to the network 112 and the plurality of application servers 118 and terminals 120 for running wildfire detection applications. The application server 118 may be configured as a middleware between the processing station and the terminals 120 for running wildfire detection applications. The application server 118 may provide services including web application hosting, resource management, connection pooling, memory allocation, load balancing, data transaction management, data access, application logic, database management, business logic processing, interoperability services, application programming interface (API) integration, and security such as encryption and data authentication.

The terminals 120 include computer terminals for accessing the processed data from the wildfire detection system 100, for example outputs of the processing station 117 transmitted through the application servers 118. The terminals 120 may include mobile devices, smartphones, tablets, desktop computers, laptops, thin clients, kiosks, data processing terminals, and workstations.

Figure 2:
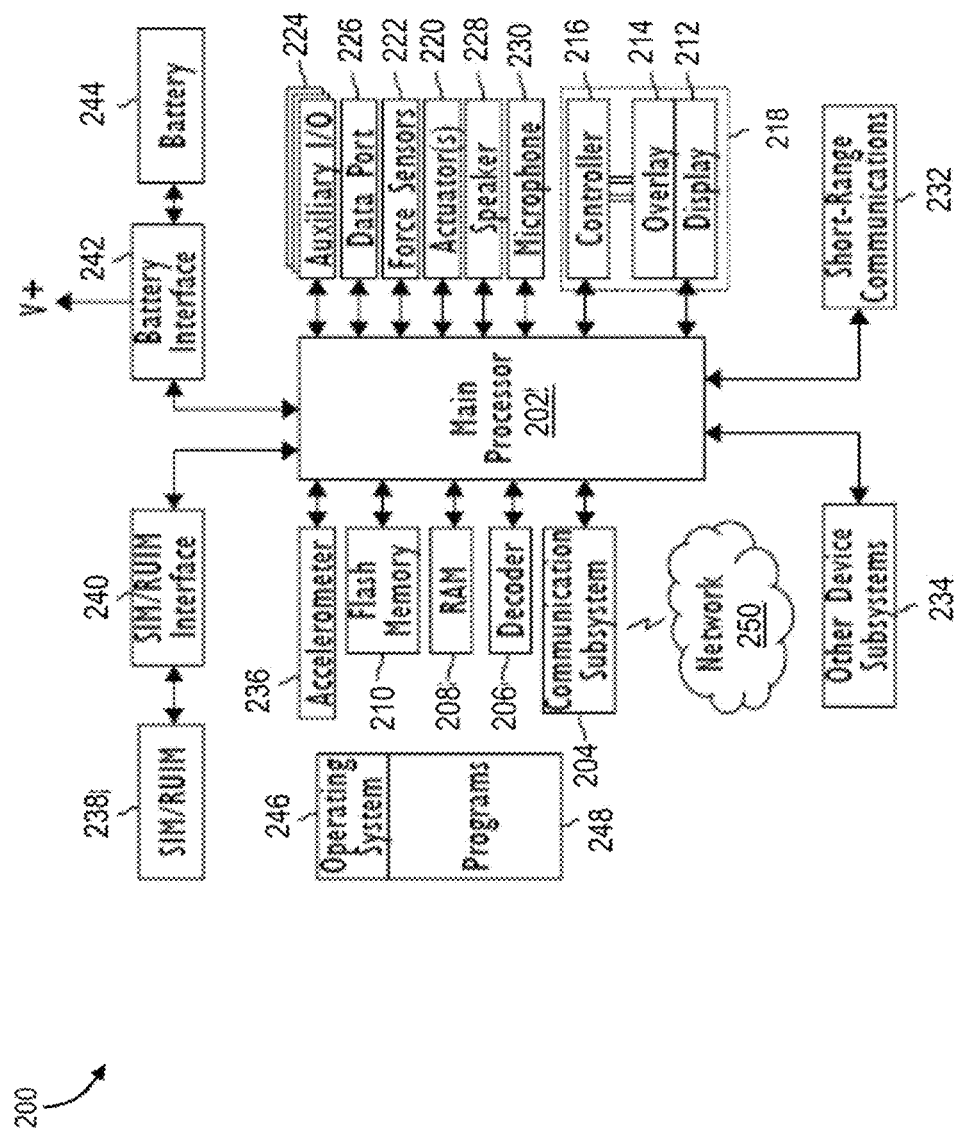
FIG. 2 is a simplified block diagram of components of a device, according to an embodiment.

Referring now to FIG. 2, shown therein is a simplified block diagram of components of a device 200, according to an embodiment. The device 200 may correspond to any of the data processing devices 110 shown in FIG. 1. The device 200 includes a processor 202 that controls the operations of the device 200. The processor 202 may be a low-power processing module in the data processing device 110. Communication functions, including data communications, voice communications, or both may be performed through a wireless communication subsystem 204. The communication subsystem may be a wireless connection module in the data processing device 110. The communication subsystem 204 may receive messages from, and send messages to, a wireless network 250. The wireless network may be the network 112 in FIG. 1. Data received by the device 200 may be decompressed and decrypted by a decoder 206.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for connecting to one or more rechargeable batteries 244. The device 200 may include a power supply assembly (not shown). The device 200 may further include one or more non-rechargeable batteries (not shown).

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the device 200 may be similar. The speaker 228 may output audible information converted from electrical signals, and the microphone 230 may convert audible information into electrical signals for processing.

Figure 3:
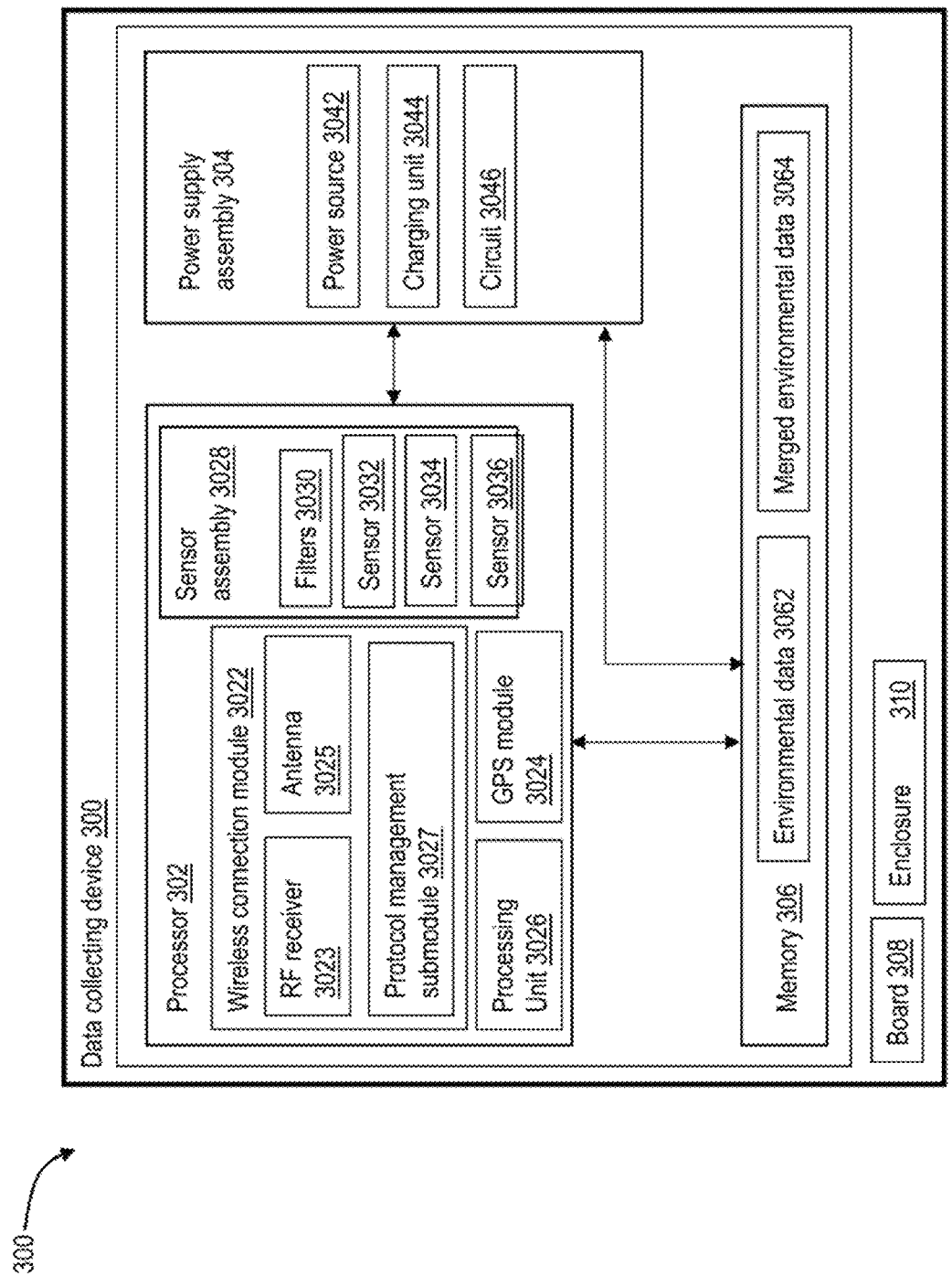
FIG. 3 is a block diagram of a data processing device for early detection and monitoring of wildfires, according to an embodiment.

Referring now to FIG. 3, shown therein is a block diagram of a data processing device 300 for early detection and monitoring of wildfires, according to an embodiment. The data processing device 300 may be a data processing device 110 of FIG. 1.

The data processing device 300 includes a processor 302, a power supply assembly 304, a memory 306, a board 308 for providing circuits, and an enclosure 310 for providing protective cover to components of the device 300.

The processor 302 includes a wireless connection module 3022 for providing connectivity services, a global positioning system (GPS) module 3024 for providing location information, a processing unit 3026 to execute instructions, and a sensor assembly 3028 including a plurality of sensors 3032-3036. The sensors 3032-3036 may be connected to a plurality of filters 3030 to improve accuracy and reliability of the measured data. The processing unit 3026 may be configured as a low-power processing module.

The power supply assembly 304 may include a power source 3042 to store and provide electrical power, a charging unit 3044 to charge the power source, and a circuit 3046 to provide control of the electrical current. The charging unit 3044 may include a solar charging apparatus including a solar panel.

The wireless connection module 3022 may be configured to connect the data processing device 300 to the wildfire detection network 112 of FIG. 1 to enable wireless data transmission and reception therebetween. The wireless connection module 3022 may connect to the network gateway 114 and other data processing devices in the wildfire detection network 112.

The wireless connection module 3022 may include a radio frequency receiver 3023 to transmit and receive signals at specific radio frequencies and at specific time intervals. The wireless connection module 3022 may be configured to convert received radio frequency signals into digital data that may be processed by the low-power processing unit 3026. The wireless connection module 3022 includes an antenna 3025 configured to convert the signals into electromagnetic waves for transmission. The wireless connection module 3022 may be configured to connect the components within the data processing device 300, including the processor 302, sensor assembly 3028, power supply assembly 304, and memory 306.

In an embodiment, in addition to the wireless communication module 3022, the data processing device 300 includes a wired communication module (not shown) suitable to communicate with other data processing devices 300 and the network gateway 114 over a hybrid network 112 as discussed in FIG. 1. Alternatively, a wired network 112 may be provided wherein the data processing device 300 may include a wired communication module (not shown) configured to communicate with other data processing devices 300 and the network gateway 114.

The wireless connection module 3022 is configured to transmit data collected by sensors 3032-3036 to the network gateway 114 or other data processing devices 300 within the wildfire detection system 100. The wireless connection module 3022 may connect the data processing device 300 to the network 112. The wireless connection module 3022 may also provide services including packet formation, error checking, encryption and addressing. The wireless connection module 3022 may provide network management tasks, including discovery of data processing devices 300, configuration of the wildfire detection network 112, and maintaining connections with other data processing devices 300.

The wireless connection module 3022 may also be configured to manage communication protocols such as Wi-Fi™, Zigbee™, Bluetooth™, LoRa and LoRaWAN to facilitate secure data transmission with low power consumption. In an embodiment, the wireless connection module 3022 is configured as a LoRa wireless connection module and/or or a LoRaWAN connection module.

The data processing device 300 is configured to operate in a plurality of modes of operation or data transmission. The plurality of modes include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The protocol management submodule 3027 in the data processing device 300 may automatically select the mode based on the location of the device 300 in the network 112. The protocol management submodule 3027 may automatically select the transmission mode based on the protocol through which the data is received. For example, a LoRa mode may be selected on receiving a LoRa message or a LoRaWAN mode may be selected on receiving a LoRaWAN message.

LoRa (Long Range) includes a digital wireless data communication technology that utilizes low frequency radio frequency bands and modulation techniques to provide long-range communication and low power consumption. The LoRa protocol may address the physical layer of communication and format the data sent and received between the data processing devices 300. LoRaWAN (Long Range Wide Area Network) includes a standardized protocol built upon LoRa technology providing higher abstraction. The LoRaWAN protocol may include both the communication protocol and system architecture for a LoRa-based network to enable efficient, secure, scalable data transmission between data processing devices 300 and network gateways 114.

The wireless connection module 3022 may include a protocol management submodule 3027. To enable low-power functionality, the protocol management submodule 3027 may be configured to provide protocol management for LoRa and LoRaWAN data transmission protocols, including providing services for each protocol. The services may include packet formation, error checking, device detection, addressing, and encryption. The protocol management submodule 3027 may format the data collected by the sensors into packets in accordance with LoRa or LoRaWAN specifications based on requirements of the network 112. Such formatting includes adding headers, metadata and control information for proper routing and processing by the network gateway 114 or other devices of the system 100. The LoRaWAN protocol may rely on error checking mechanisms such as Cyclic Redundancy Check (CRC) or Forward Error Correction (FEC) to detect and correct errors during data transmission. The protocol management submodule 3027 may be configured to implement the error checking and provide data integrity and reliability information. Further, the LoRaWAN protocol may utilize device identifiers (DevEUI) and network identifiers (NetID) to address data processing devices on the wildfire detection network. The protocol management submodule 3027 may be configured to manage an addressing scheme therefor and to provide data transmission between data processing devices 300 and routing within the system 100. Furthermore, the LoRaWAN protocol may utilize an adaptive data rate mechanism that adjusts data rates and transmission power of the devices 300 based on distance of each device 300 from the gateway 114 and further based on conditions of the network 112. The protocol management submodule 3027 may be configured to manage this feature, optimizing energy consumption and network capacity.

To provide security services, the protocol management submodule 3027 may be configured to implement security features of LoRaWAN or LoRa security features. The protocol management submodule 3027 may be configured to implement encryption mechanisms such as Advanced Encryption Standard (AES) with a 128-bit key to protect sensitive information from unauthorized access.

The protocol management submodule 3027 may be configured to perform network and protocol related tasks, including device activation and joining procedures and acknowledging and processing messages sent from the network gateway 114.

The protocol management submodule 3027 may also provide for and/or enable optimized power consumption to save energy and extend battery life of each device 300. Such optimized power consumption includes time-synchronization and entering low-power modes when each device 300 is not actively transmitting or receiving data. The protocol management submodule 3027 may be configured to operate the time synchronization with respect to each of sensors 3032-3036. The sensors 3032-3036 and processing unit 3026 may be optimized for reduced power consumption through time synchronization techniques. Techniques including duty cycling, time-slotted communication, coordinated sensing, power-efficient routing, and reduced idle listening may be used. The processing unit 3026 may be configured to activate data collection in the sensors 3032-3036 at predefined time schedules and enter low-power inactive modes outside of the predefined time schedules and/or cause the sensors 3032-3036, the radio-frequency (RF) receiver 2023, and the antenna 3025 to enter low-power inactive modes outside the predefined time schedules. Similarly, the protocol management submodule 3027 may be configured to receive and transmit environmental data at predefined time schedules and alternatively enter low-power inactive modes.

The processing unit 3026 may be configured as a low-power processing module. The low-power processing module 3026 may be connected to the wireless connection module 3022 and other components of the data processing device 300. The low-power processing module 3026 may be configured to receive data from the sensor assembly 3028 and the GPS module 3024. The low-power processing module 3026 may process or merge the data and communicate the processed data to the network 112 through the wireless connection module 3022.

The low-power processing module 3026, may be configured as low-power computing systems configured to execute instructions stored in memory 306 or on other similar storage devices. The instructions may include one or more separate programs, which may comprise an ordered listing of executable instructions for implementing logical functions. The low-power processing module 3026 may control the execution of other computer programs and provides scheduling, input-output control, file and data management, memory management, and communication control and related services.

The filters 3030 may be used to provide protection to the plurality of sensors 3032-3036 and enhance performance, improve measurement accuracy, and protect the sensors 3032-3036 from interfering signals. The filters 3030 may include bandpass filters to allow a specific wavelength range of light to enter the sensors, neutral density filters to attenuate the intensity of light entering the sensor, chemical filters to allow selective detection of gases, particulate filters to prevent solid particles, dust, or aerosols from interfering with the sensing process, hydrophobic filters to prevent the ingress of water vapor or liquid water, moisture control filters to control humidity levels, and/or temperature control filters.

Data sensed by the sensors 3032-3036 is stored in the memory 306 as environmental data 3062. The environmental data 3062 may thereafter be transmitted to the low-power processing module 3026. Detection by the sensors 3032-3036 is configured to collect and monitor the environmental data 3062 to facilitate detection of conditions suggesting wildfire. The conditions may include detecting, identifying, and measuring the environmental data 3062 in proximity to the sensors 3032-3036 such as chemicals, gases, and physical conditions such as temperature and humidity. When environmental data 3062 received at a device 300 from a different device 300 is merged with environmental data 3062 collected at the device 300, such merged data is stored in the memory 306 as merged data 3064. The plurality of sensors 3032 to 3036 are configured for low power consumption and provide ultra-early wildfire detection using time synchronization as hereinabove described. The sensors 3032-3036 detect environmental conditions, such as the presence/absence of elements associated with fire such as carbon dioxide, carbon monoxide, nitrogen dioxide, temperature, and/or humidity. The conditions may include temperature, humidity, smoke, or infrared radiation. A temperature sensor (e.g., the sensor 3032) may include a thermistor or thermocouple to measure the ambient temperature in a surrounding environment. When the temperature sensor 3032 records a sudden increase in temperature or once a predefined threshold is exceeded, this may indicate fire activity. A humidity sensor (e.g., the sensor 3034) may detect air humidity and moisture levels in the environment close to the sensor. A low humidity level may indicate a risk of wildfire.

A smoke sensor (e.g., the sensor 3036) may include optical, photoelectric, ionization, or other types of sensors configured to detect the presence of smoke particles in the air. The presence of smoke may indicate a wildfire. Further, a gas sensor (e.g., the sensor 3036) may detect the presence of combustion gases. The gas sensor 3036 may be configured to detect carbon monoxide (CO) or volatile organic compounds (VOCs) that may be produced during a fire. Humidity data may be combined with other sensor data to assess the likelihood of a wildfire occurring. The sensors 3032-3036 may further detect wind speed and direction.

The data processing device 300 includes a power supply assembly 304 to provide electrical power to the components of the data processing device 300.

The power supply assembly 304 includes a power source 3042 to store and provide electrical power, a charging unit 3044 to charge the power source, and a circuit 3046 to provide control of the electrical current. The charging unit 3044 may include a solar charging apparatus including a solar panel.

In an embodiment, the power source 3042 includes a plurality of batteries. The power source includes a non-rechargeable and a rechargeable battery. The rechargeable battery may be a solar cell. The plurality of batteries may include rechargeable batteries and high-capacity non-rechargeable batteries. The power collection apparatus may include a solar cell for charging the plurality of batteries. The rechargeable battery may serve as a first power source until an energy level of the rechargeable battery reaches a predetermined limit. The non-rechargeable battery may serve as a second power source when the energy level is at the predetermined limit until the rechargeable battery is recharged so that the energy level is not at the predetermined limit.

The power management circuit 3046 may be configured as a smart power management circuit. The smart power management circuit 3046 may recharge a battery of the charging unit 3044 until the battery capacity drops below a threshold (e.g., 30%). At that point, the circuit 3046 may switch to a high-capacity non-rechargeable battery until the rechargeable battery recharges to a predetermined threshold (80%). This feature reduces power consumption of the device 300. Furthermore, the circuit 3046 may optimize warm-up times of the sensors 3042-3046 and intervals in data transmission.

The data processing device 300 may be physically enclosed in a protective enclosure 310.

The board 308 may have a modular design. The board 308 may be configured to provide for the sensors 3042-3046 to be integrated into or removed from the device 300. The board 308 may be configured to receive the filter 3030. In an embodiment, the filter 3030 is a removable gas filter.

Figure 4:
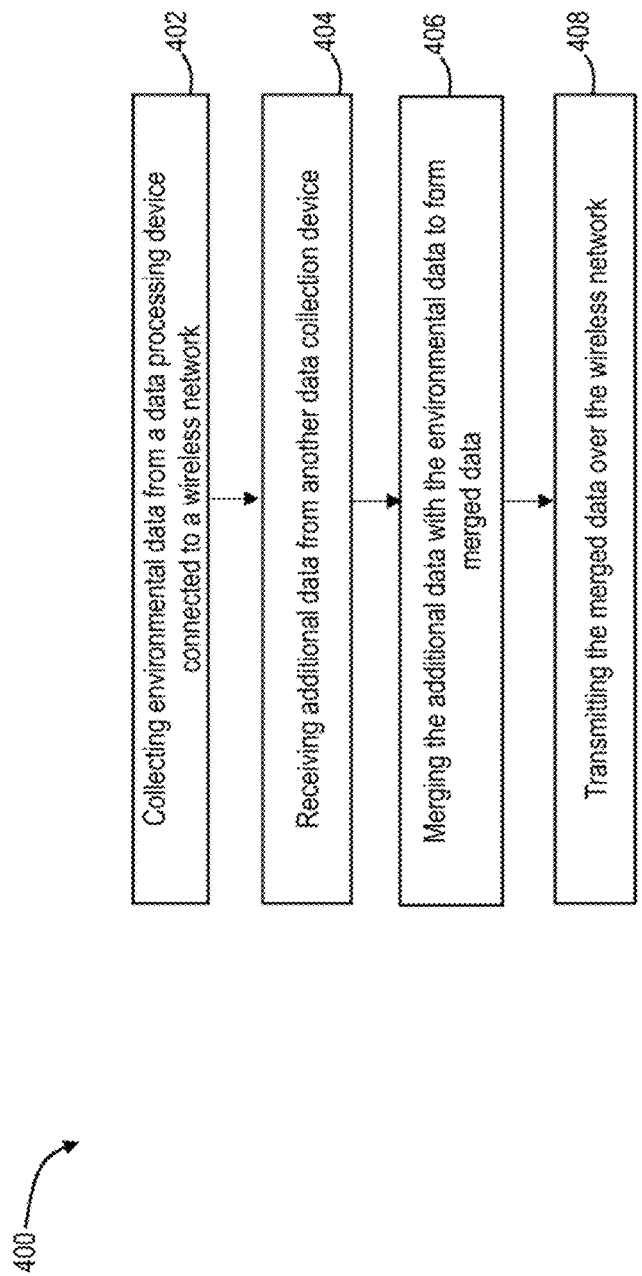
FIG. 4 is a flow diagram of a method for early detection and monitoring of wildfires, according to an embodiment.

Referring now to FIG. 4, shown therein is a flow diagram of a method 400 for early detection and monitoring of wildfires, according to an embodiment.

At 402, environmental data is collected from a data processing device connected to a wireless network. The data processing device may be the data processing device 110 of FIG. 1 connected to the network 112 of the system 100. The data processing device may be the data processing device 300 of FIG. 3.

At 404, additional data from a neighboring data processing device is received. In an embodiment, the neighboring data processing device is a different data processing device 110 or 300. The additional environmental data may include the environmental data sensed by the neighboring data processing device 110 or 300. The additional environmental data may include the environmental data received by the neighboring data processing device 110 or 300 from another data processing device 110 or 300.

At 406, the additional data received from the neighboring data processing device is merged with the environmental data sensed by the data processing device to form merged data. In an embodiment, the processing unit 3026 merges the environmental data from the sensors 3032-3036 with the additional data from the neighbouring data processing devices 300 (whether collected by the sensors 3032-3036 of the neighbouring devices 300 or received from still other devices 300) to form the merged data.

A first data processing device may sense and process environmental data locally. Thereafter, the first data processing device may receive processed environmental data from a second device. The first data processing device may provide data packaging operations to merge environmental data sensed thereby with the additional environmental data collected from the neighboring device. The data packaging operations may include format change, protocol optimization, data encoding, data encapsulation, data segmentation, and data compression. Such a collaborative approach between and among the data processing devices provides coverage over a larger area, improves data accuracy, and increase the reliability of the overall system.

At 408, the merged data is transmitted over a network. In an embodiment, the processing unit 3026 transmits the merged data through the wireless connection module 3032. In an embodiment, the merged data is transmitted to the network gateway 114. The network gateway 114 may perform additional processing and analysis. The environmental data is transmitted to the network server 116 or processing station 117 for additional processing and aggregation. The data is received by the application servers 188, where the data may be visualized, monitored, or used for decision-making purposes. The data may ultimately be received by the terminals 120.

Each component of the system may receive related data, information, or instructions from the network.

The low-powered wildfire detection system provides energy efficiency, extended operational life, scalability, and improved communication. Interoperability across a variety of network protocols is achieved and provides enhanced effectiveness and versatility of the system. Devices using different protocols may communicate with one another effectively. As a result, various protocols may be implemented in the network infrastructure providing simplified integration, scalability, enhanced reliability, fault tolerance, and cost savings. By providing time synchronization, power consumption is reduced. The sensors may collect environmental data at predetermined time schedules, obviating the need of keeping the antennas active for longer duration. As a result, the sensors may operate for longer periods without requiring battery replacement or recharging. The sensors may operate in a synchronized manner leading to efficient network management, improved sensor collaboration, and enhanced data accuracy. The optimized power supply including rechargeable and non-rechargeable batteries may provide further advantages via extended device operation time, reliability, and improved performance. The power supply redundancy, including consumption of a solar powered rechargeable battery until the power levels in battery are critically low and then shifting to a non-rechargeable battery until the rechargeable battery is at least partially recharged, provides for flexible power management and power adaptability.

Referring now to FIG. 5, shown therein is a top view of a system for early wildfire detection in deployment. The system 500 includes a plurality of data processing devices 502 disposed in a mesh topology. In the interest of clarity, not all the data processing devices 502 are labelled in FIG. 5, but it will be appreciated that like symbols are all data processing devices 502. The data processing devices 502 may be the data processing devices 110 of FIG. 1 or the data processing devices 300 of FIG. 3.

Advantageously, each device 502 may communicate with network gateways (not shown) in FIG. 5 according to multiple paths. Therefore there is redundancy in the deployment shown in FIG. 5 because the deactivation of any one device 502 does not impede the system 500. For example, if one or both of the two sensors marked 502 were rendered non-functional (e.g., destroyed by wildlife), neighbouring devices 502 thereto may advantageously continue to transmit collected environmental data along a different and previously redundant path to a network gateway.

Figure 6:
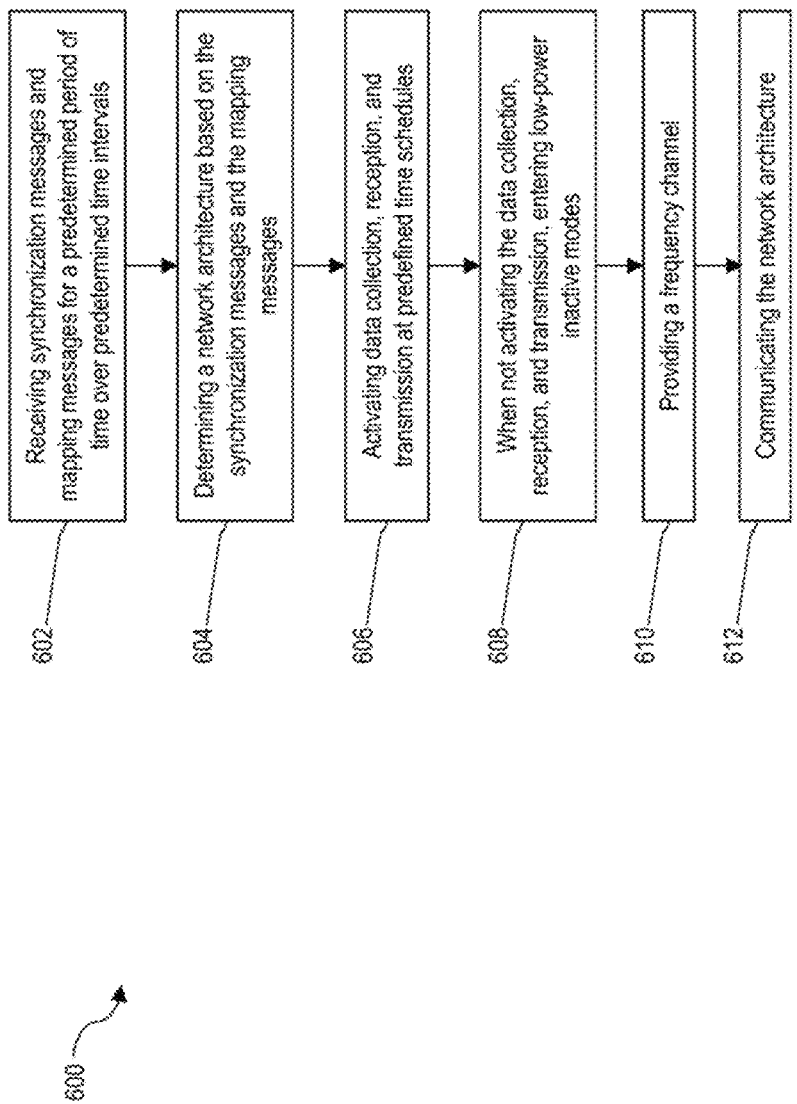
FIG. 6 is a flow diagram of a method for network configuration in early detection and monitoring of wildfires, according to an embodiment.

Referring now to FIG. 6, shown therein is a flow diagram of a method 600 for network configuration in early detection and monitoring of wildfires, according to an embodiment. The method 600 may be implemented at the system 100 of FIG. 1.

At 602, a server receives synchronization messages and mapping messages from a plurality of data processing devices over the network for a predetermined period of time and over predetermined time intervals. The data processing devices may be the data processing devices 110 of FIG. 1.

At 604, the server determines a network architecture based upon the synchronization messages and the mapping messages. In an embodiment, the network architecture is determined based on data transmission between the data processing devices.

The synchronization messages provide time synchronization between the data processing devices. Time synchronization techniques include duty cycling, time-slotted communication, coordinated sensing, power-efficient routing, and reduced idle listening.

At 606, the data processing devices activate data collection, reception, and transmission at predefined time schedules.

At 608, when not activating the data collection, reception, and transmission, the data processing devices enter low-power inactive modes. The data processing devices 110 are mutually synchronized to provide coordinated sensing and power-efficient routing.

The synchronization messages and the mapping messages, individually or combined, may be delivered by the data processing devices to the network gateway. In an embodiment, each data processing device sends the synchronization messages and the mapping messages to the network gateway. The sensor assembly in the data processing device may be configured to send the synchronization messages and mapping messages to the network gateway. The wireless communication module in the data processing device may be configured to send the synchronization messages and the mapping messages to the network gateway.

In an embodiment, the synchronization and mapping message are sent by the network gateway to the network server. The network gateway may be a LoRaWAN gateway. The network server may be a cloud server. The cloud server may include a memory, a processor, and executable instructions. The network gateway may process the synchronization and mapping message before transmitting the messages to the network server.

In an embodiment, the synchronization and mapping messages are transmitted on a LoRa 8-frequency channel. In another embodiment, the data processing devices and the network gateway transmit data on multiple frequency channels to reduce interference and increase traffic handling capacity. The synchronization messages and the mapping messages may be transmitted at a specific time period. The synchronization messages and the mapping messages may be transmitted at a pre-defined time interval.

In an embodiment, the data processing devices and the network gateway listen for, receive, or detect any communication via each of the 8 frequency channels. In an embodiment, the data processing device receives the synchronization messages and the mapping messages from the other data processing devices over the network. The low-power processing module in the data processing device may be configured to add the device's own synchronization message and mapping message with the received synchronization messages and mapping messages received from the other data processing devices for transmitting the combined messages to the network gateway.

In an embodiment, when any of the data processing devices and the LoRaWAN Gateway receive one of the messages from a neighbouring device or from the LoRaWAN Gateway, the receiving data processing device and/or the receiving LoRaWAN Gateway add data within the message for transmission during the next interval.

The mapping messages provide further details to ensure that data processing devices are synchronized according to the structure and content of the data being transmitted. The mapping messages may be sent at the beginning of a data transmission and provide information about the size, format, and content of the data packets.

The network architecture include a plurality of modes of operation for each data processing device. The mapping messages may include details on the modes of operation for each data processing device. The plurality of modes of operation include LoRa end-node, LoRaWAN end-node, LoRa repeater mode, and LoRa to LoRaWAN mode. The modes of operation represent interoperability operations and utilities such as low battery consumption (LoRa), long-distance communication (LoRaWAN), extending communications (repeater mode), and interoperability between LoRa and LoRaWAN protocols, respectively.

At 610, the method 600 includes providing in the network architecture a frequency channel for each data processing device for transmission of environmental data over the network. The mapping messages may include details on the frequency channel for each data processing device.

The network architecture may include an optimization path.

The network architecture may be dynamic and/or hybrid. The network architecture may include a multi-layer star topology. The network architecture may include a mesh topology. The network architecture may include a tree topology. one or more of the following characteristics: dynamic; hybrid; multi-layer star; mesh; and tree topology.

The network architecture may include the identity of each data processing device to be re-broadcast by one or more of the other data processing devices. The identity of each data processing device may be included in one or more of the mapping message. The identity of the data processing device may refer to a unique identifier that is assigned to the device and may be used to distinguish it from other devices on a network.

After a synchronization and mapping period is complete, the network server may collect the data from the data processing devices and/or the LoRaWAN gateway. The data may include the synchronization messages and the mapping messages from all the data processing devices and/or the LoRaWAN gateway(s) in the network.

At 612, the server communicates the network architecture to the plurality of data processing devices over the network.

On receiving the synchronization and mapping data of the data processing devices and the network gateway(s), the server uses the data to define the network architecture of the data processing devices and the network gateways. The server may define the modes of operation of each data processing device in the network.

The network server may define the frequency channel in which the devices transmit data. The data so transmitted may include the synchronization messages and the mapping messages. The server may optimize the path for each synchronization message and each mapping message received from the data processing devices within the network. The server may send a message for each device indicating which other device messages should re-broadcasted.

Figure 7:
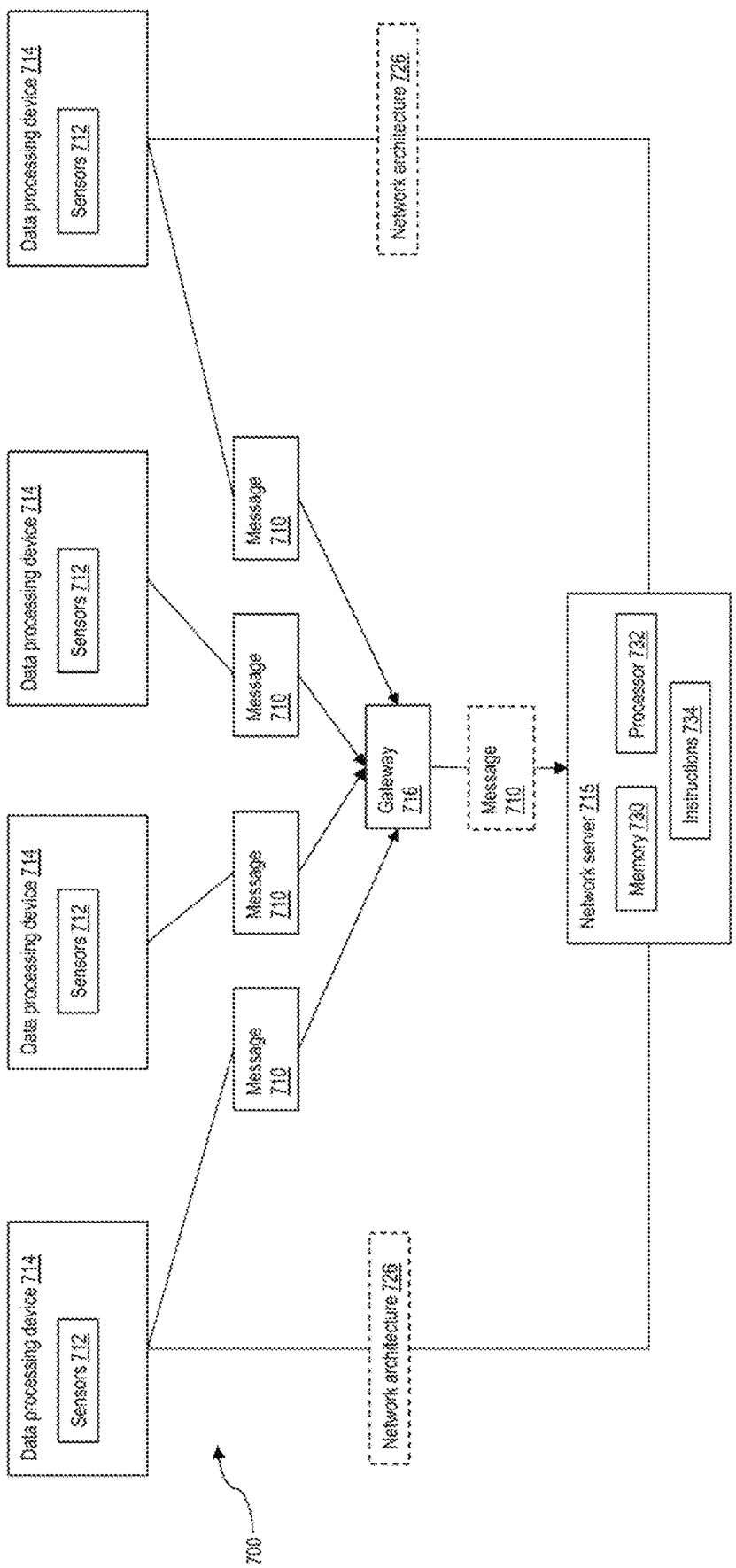
FIG. 7 is a schematic diagram of a system for network configuration in early detection and monitoring of wildfires, according to an embodiment.

Referring now to FIG. 7, shown therein is a schematic diagram of a system 700 for network configuration in early detection and monitoring of wildfires, according to an embodiment.

The system 700 includes a plurality of data processing devices 714a, 714b, 714c, and 714d (collectively referred to as the devices 714 and generically referred to as the device 714) configured to send synchronization and mapping messages 710 to a network gateway 716. The device 714 may be a data processing device 110 of FIG. 1. The device 714 includes sensors 712 for sensing environmental data.

The synchronization and mapping messages 710 may be transmitted on a LoRa 8 frequency channel. The data processing devices 714 and the network gateway 716 may transmit data on multiple frequency channels to reduce interference and increase traffic handling capacity. The synchronization and mapping messages 710 may be transmitted at a specific time period. The synchronization and mapping messages 710 may be transmitted at a pre-defined time interval. In an embodiment, the data processing devices 714 and the network gateway 716 may listen for, receive, or detect any communication on each of the 8 frequency channels. Each data processing device 714 may receive the messages 710 from the other data processing devices 714 over a network. The low-power processing module in the data processing device 714 may be configured to add the synchronization and mapping message 710 of the device 714 with the synchronization and mapping message 710 received from the other data processing devices 714 for transmitting the combined message (not shown) to the network gateway 716.

In an embodiment, when any of the data processing devices 714 and the gateway 716 receive one of the messages 710 from a neighboring device 714 or from the gateway 716, the data processing device 714 and/or the gateway 716 add data within the message 710 for transmission during the next interval.

The gateway 716 is configured to receive the synchronization and mapping messages 710 from the data processing devices 714 over the network for a predetermined period of time and time intervals. The synchronization and mapping messages 710 may be sent by the network gateways 716 to a network server 715.

The network server 715 determines a network architecture 726 based upon the synchronization and mapping messages 710. In an embodiment, the network architecture 726 is determined based on data transmission between the data processing devices 714.

The messages include synchronization messages and mapping messages. The synchronization messages may provide time synchronization between the data processing devices 714. Time synchronization techniques may include duty cycling, time-slotted communication, coordinated sensing, power-efficient routing, and reduced idle listening. The data processing devices 714 may be configured to activate data collection, reception, and transmission at predefined time schedules, and alternatively enter low-power inactive modes. Furthermore, the data processing device 714 may be synchronized with other devices to provide coordinated sensing and power-efficient routing.

The synchronization messages and the mapping messages, individually or combined, may be delivered by the data processing devices 714 to the network gateway 716. In an embodiment, each data processing device 714 sends the messages 710 to the gateway 716. In an embodiment, the sensors 712 are configured to send the message 710 to the gateway 716. In another embodiment, the wireless communication module in the data processing device 714 may be configured to send the message 710 to the gateway 716.

In an embodiment, the message 710 is sent by the network gateway 716 to the network server 715. The gateway 716 may be a LoRaWAN gateway. The network server 715 may be a cloud server. The cloud server 715 may include a memory 730, a processor 732, and executable instructions 734. The network gateway 716 may process the synchronization and mapping message 710 before transmitting the message to the network server 715.

The mapping messages (not shown) may provide details to ensure that the data processing devices 714 are synchronized with respect to the structure and content of the data being transmitted. The mapping messages 710 may be sent at the beginning of a data transmission and provide information about the size, format, and content of data packets of the data transmission.

The network architecture 726 may include a plurality of modes of operation for each data processing device 714. The mapping messages may include details on the modes of operation for each data processing device 714. The plurality of modes of operation may include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively.

The network architecture 726 may include a frequency channel for each data processing device 714 for transmission of environmental data over the network. The mapping messages may include details on the frequency channel for each data processing device 714.

The network architecture 726 may include an optimization path.

The network architecture 726 may include the identity of each data processing device 714 to be re-broadcast by one or more of the other data processing devices 714. The identity of each data processing device 714 may be included in the mapping message. The identity of the data processing device 714 may refer to a unique identifier that is assigned to the device 714 and may be used to distinguish it from other devices on a network.

After a synchronization and mapping period is complete, the network server 715 collects the data from the data processing devices 714 and/or the network gateway 716. The data may include the synchronization and mapping messages 710 from the data processing devices 714 and/or the LoRaWAN gateway(s) 716 in the network.

The cloud server 715 is configured to communicate the network architecture 726 to the plurality of data processing devices 714 over the network.

On receiving the synchronization and mapping messages 710 of the data processing devices 714 and the network gateway(s) 716, the network server 715 uses the data to define the network architecture 726 of the data processing devices 714 and the network gateway(s) 716. The network server 715 may define the modes of operation of each data processing device 714 in the network.

The network server 715 may define the frequency channel in which the devices 714 may transmit data. The data may include the synchronization and mapping messages 710. The network server 715 may optimize the path for each synchronization and mapping message 710 received from the data processing devices 714 within the network. The network server 715 may send a message for each device indicating which other device messages should re-broadcasted.

Figure 8:
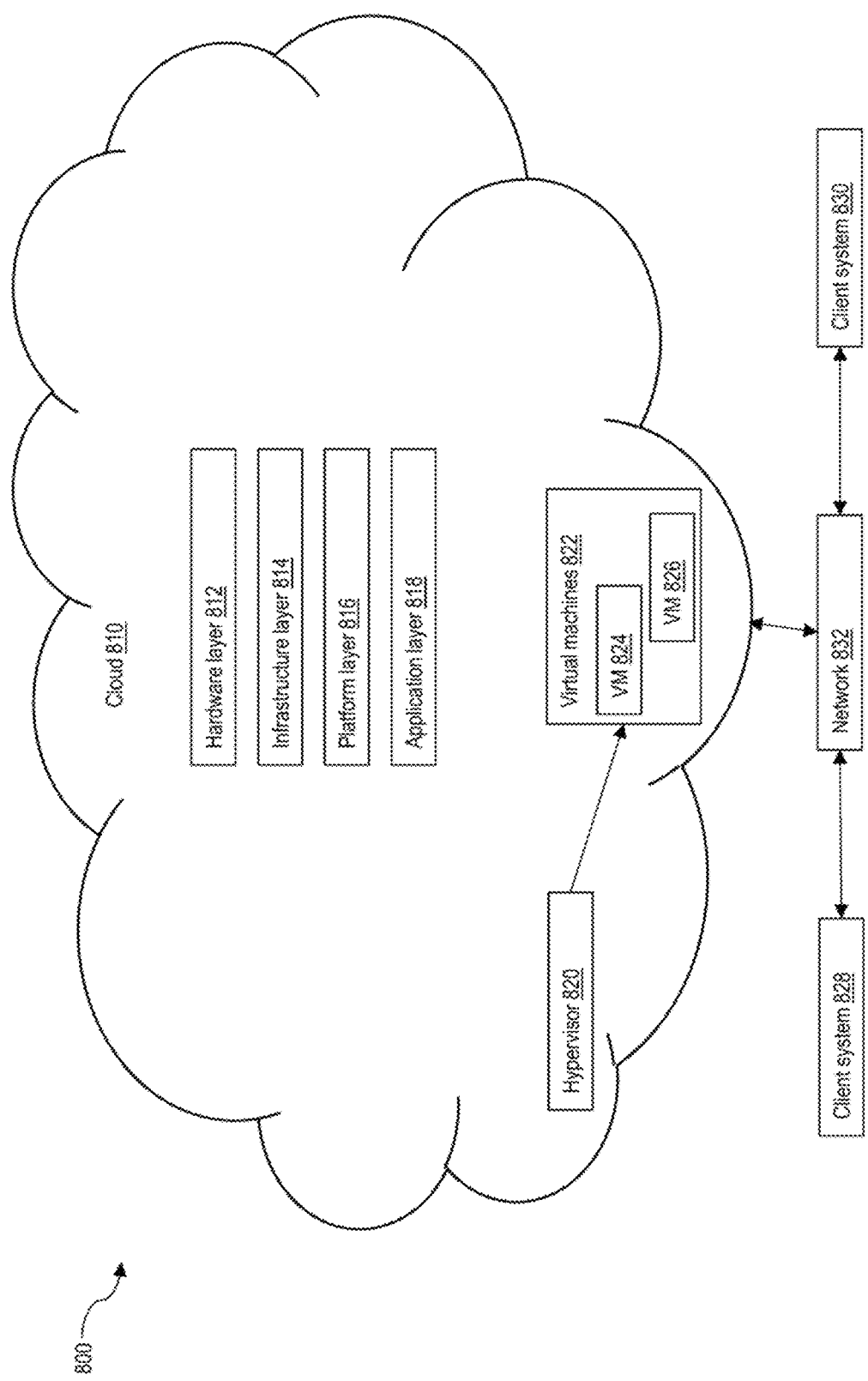
FIG. 8 is a schematic diagram of a cloud environment of a network configuration for early detection and monitoring of wildfires, according to an embodiment.

Referring now to FIG. 8, shown therein is a schematic diagram of a cloud environment 800 of a network configuration for early detection and monitoring of wildfires, according to an embodiment.

The exemplary cloud environment 800 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network to be accessed through a web browser or any other computing component. Software or components of the environment 800 as well as the corresponding data may be stored on servers at a remote location. The computing resources in a cloud computing environment may be consolidated at a remote data center location or may be dispersed. Cloud computing infrastructures may deliver services through shared data centers, even though they appear as a single point of access for the user. Thus, the components and functions described herein may be provided from a service provider at a remote location using a cloud computing environment. Alternatively, they may be provided from a conventional server, or they may be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud may be managed by a vendor and typically supports multiple consumers using the same infrastructure. Moreover, a public cloud, as opposed to a private cloud, may free up the end users from managing the hardware. A private cloud may be managed by the organization itself and the infrastructure is typically not shared with other organizations. The organization still maintains the hardware to some extent, such as installations and repairs, etc.

The cloud environment 800 includes a cloud server 810. The cloud server 810 (or each of the different premises on the cloud server 810) includes a hardware layer 812, an infrastructure layer 814, a platform layer 816, and an application layer 818.

A hypervisor 820 may illustratively manage or supervise a set of virtual machines 822. The virtual machines 822 may include a plurality of different, independent, virtual machines 824-826. Each virtual machine 824, 826 may illustratively be an isolated software container that has an operating system and an application. The isolated software container may be illustratively decoupled from a host server by the hypervisor 820. In addition, the hypervisor 820 may spin up additional virtual machines or close virtual machines. The hypervisor 820 may, based upon workload or other processing unit, merge environmental data collected from sensors with additional criteria.

A plurality of different client systems 828-830 (which may be end user systems or administrator systems, or both) may illustratively access cloud server 810 over a network 832. Depending upon the type of service being used by each of the client systems 828-830, the cloud 810 may provide different levels of service. In an embodiment, users of the client systems are provided access to application software and databases. The cloud 810 manages the infrastructure and platforms that run the application. This may be referred to as software as a service (or SaaS). The software providers operate application software in application layer 818 and end users access the software through the different client systems 828-830.

The cloud provider may further use platform layer 816 to provide a platform as a service (PaaS). This includes an operating system, programming language execution environment, database, and webserver being provided to the client systems 828-830, as a service, from the cloud provider. Application developers may develop and run software applications on the platform layer 816 and the provider of the cloud 810 manages the underlying hardware layer 812, infrastructure layer 814, and application layer 818.

The cloud provider may further use the infrastructure layer 814 to provide infrastructure as a service (IaaS). In such a service, physical or virtual machines and other resources are provided by the cloud provider, as a service. These resources are provided, on-demand, by the IaaS cloud provider, from large pools installed to form merged datacenters. In order to deploy applications, the cloud users that use IaaS install operating-system images and application software on the cloud environment 800.

Figure 9:
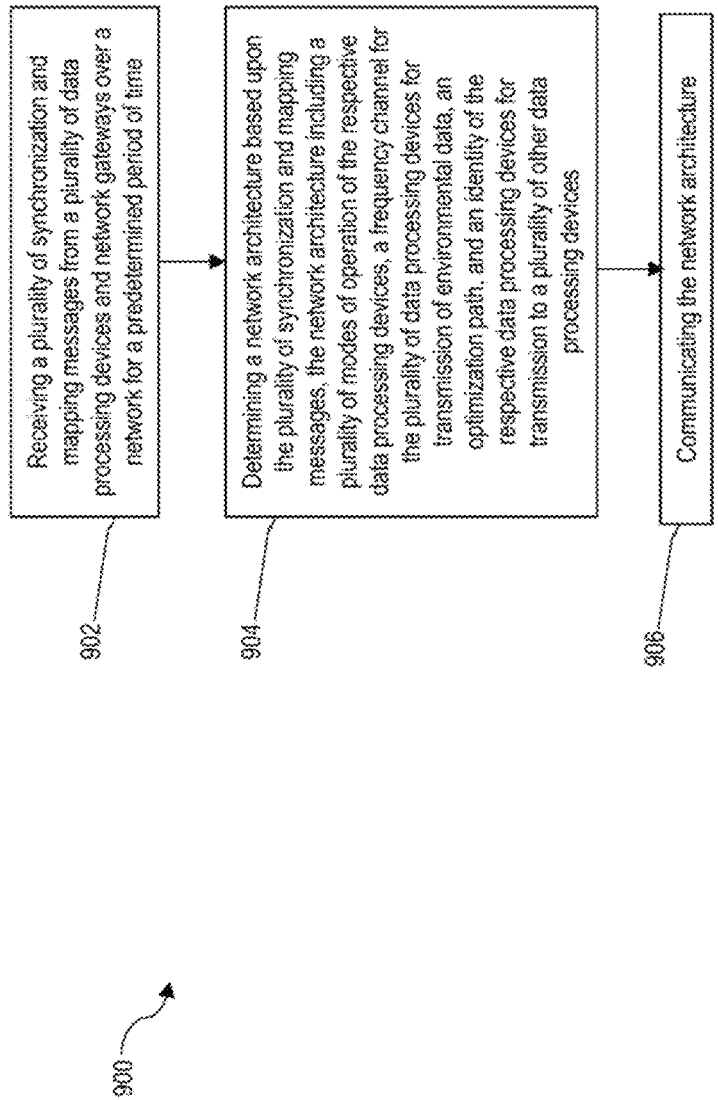
FIG. 9 is a flow diagram of a detection and network configuration method, according to an embodiment.

Referring now to FIG. 9, shown therein is a flow diagram of a detection and network configuration method 900.

At 902, the method 900 includes receiving a plurality of synchronization and mapping messages from a plurality of data processing devices and network gateways over a network for a predetermined period of time.

At 904, the method 900 includes determining a network architecture based upon the plurality of synchronization and mapping messages. The network architecture includes a plurality of modes of operation of the respective data processing devices, a frequency channel for the plurality of data processing devices for transmission of environmental data, an optimization path, and an identity of the respective data processing devices for transmission to a plurality of other data processing devices.

At 906, the method 900 includes communicating the network architecture to the plurality of data processing devices over the network.

The subject disclosure includes a wildfire detection system network configuration apparatus and, more specifically, a cloud-based apparatus that monitors environmental data collection devices within a network for a predetermined period of time and configures the network based upon information that is collected during that predetermined period of time. The network includes multiple sensors for collecting environmental data that relates to wildfires. The network includes a plurality of low-power data collection devices arranged for ultra-early wildfire detection.

The detailed description provided below in connection with the appended drawings is intended as a description of examples and is not intended to represent the only forms in which the present examples can be constructed or utilized.

The description sets forth functions of the examples and sequences of steps for constructing and operating the examples. However, the same or equivalent functions and sequences can be accomplished by different examples.

References to "one embodiment", "an embodiment", "an example embodiment", "one implementation", "an implementation", "one example", "an example", and the like, indicate that the described embodiment, implementation, or example may include a particular feature, structure or characteristic, but not every embodiment, implementation, or example may necessarily include the particular feature, structure, or characteristic. Moreover, such phrases are not necessarily referring to the same embodiment, implementation, or example. Furthermore, when a particular feature, structure, or characteristic is described in connection with an embodiment, implementation, or example, it is to be appreciated that such feature, structure, or characteristic may be implemented in connection with other embodiments, implementations, or examples whether or not explicitly described.

References to an "app", an "application", and/or a "software application" shall refer to a computer program or group of programs designed for end users. The terms shall encompass standalone applications, thin client applications, thick client applications, web-based applications, such as a browser, and other similar applications.

Numerous specific details are set forth in order to provide a thorough understanding of one or more embodiments of the described subject matter. It is to be appreciated, however, that such embodiments may be practised without these specific details.

Various features of the subject disclosure are described in detail with reference to the drawings, wherein like numerals generally refer to like or corresponding elements throughout. The drawings and detailed description are not intended to limit the claimed subject matter to the particular form described. Rather, the intention is to cover all modifications, equivalents, and alternatives falling within the spirit and scope of the claimed subject matter.

Computer readable storage mediums, as described herein, may be a tangible device that retains and stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk™, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to exploit features of the present disclosure.

Embodiments and features of the subject disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, devices, and computer program products according to various embodiments of the subject disclosure.

In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The detailed description provided above in connection with the appended drawings explicitly describes and supports various features of a wildfire detection system and network. By way of illustration and not limitation, supported embodiments include an apparatus for configuring a wildfire detection system network including a network gateway a plurality of data collection devices connecting to the network gateway over the network with each of the plurality of data collection devices having a plurality of sensors thereon and a server connecting the plurality of data collection devices through the network gateway over the network. Each of the plurality of data collecting devices collects environmental data from the plurality of sensors thereon. The server includes memory having computer readable instructions and a processor for executing the computer readable instructions, the computer readable instructions including instructions for receiving synchronization and mapping messages from the plurality of data collection devices over the network for a predetermined period of time, determining a network architecture based upon the synchronization and mapping messages with the network architecture including modes of operation of each of plurality of data collection devices, a frequency channel for each of the plurality of data collection devices for transmission of environmental data over the network, an optimization path, and the identity of each of the plurality of data collection devices that should be re-broadcast by one or more of the other data collection devices, and communicating the network architecture to the plurality of data collection devices over the network.

Supported embodiments include the foregoing apparatus, wherein the network gateway sends the synchronization and mapping messages.

Supported embodiments include any of the foregoing apparatus, wherein the server is a cloud server.

Supported embodiments include the foregoing apparatus, where each of the plurality of sensors can transmit over a plurality of channels.

Supported embodiments include the foregoing apparatus, wherein the server receives synchronization and mapping messages from the plurality of data collection devices over the network for a predetermined period of time in a predefined time-interval.

Supported embodiments include a device, a system, a method, a computer-readable storage medium, a computer program product and/or means for implementing any of the foregoing apparatus or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein may represent one or more of any number of processing strategies. As such, various operations illustrated and/or described may be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

The detailed description provided above in connection with the appended drawings is intended as a description of examples and is not intended to represent the only forms in which the present examples may be constructed or utilized.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

The invention claimed is:

1. A detection and network configuration system comprising:
   a plurality of data processing devices;
   a network configuration server, the network configuration server comprising:
     a processor; and
     a memory communicatively connected with the at least one processor, the memory storing computer-executable instructions thereon that, when executed by the processor, cause the network configuration server to:
       receive a plurality of synchronization and mapping messages from the plurality of data processing devices and a plurality of network gateways over a network for a predetermined period of time;
       determine a network architecture based upon the plurality of synchronization and mapping messages, the network architecture including:
         a plurality of modes of operation of the plurality of data processing devices;
         a plurality of frequency channels for the plurality of data processing devices for transmission of environmental data;
         an optimization path; and
         an identity of a data processing device for transmission to another data processing device; and
       communicate the network architecture to the plurality of data processing devices over the network;
   the plurality of network gateways configured to provide a communication interoperability interface between a plurality of network protocols;
   a network server for providing network services including data processing, storage, application and device management, and resource sharing, the network server connected to the plurality of network gateways;
   wherein the plurality of network protocols includes any one or more of a LoRa (Long Range) network protocol and a LoRaWAN (Long Range Wide Area Network) network protocol, and wherein the environmental data relates to the presence or absence of a wildfire;

wherein the data processing device automatically selects a network protocol from the plurality of network protocols based on a location of the data processing device and/or a received network protocol received from the other data processing device;

wherein the plurality of data processing devices and the plurality of network gateways are configured to transmit data in a time synchronization, wherein the time synchronization includes reduced idle listening;

wherein the plurality of data processing devices and the plurality of network gateways are configured to transmit data on each of the plurality of frequency channels;

wherein the plurality of data processing devices are configured in a mesh topology.

2. The detection and network configuration system of claim 1, wherein the time synchronization further includes any one or more of duty cycling, time-slotted communication, coordinated sensing, and power-efficient routing.

3. The detection and network configuration system of claim 1, wherein the data processing device includes a sensor assembly, wherein the sensor assembly includes a plurality of sensors configured to detect the environmental data, the environmental data relating to any one or more of carbon dioxide, carbon monoxide, nitrogen dioxide, temperature, and humidity, and wherein the sensor assembly includes a filter configured to improve measurement accuracy.

4. The detection and network configuration system of claim 3, wherein the filter is configured as a bandpass filter or a neutral density filter.

5. The detection and network configuration system of claim 3, wherein the filter is configured as a chemical filter or a particulate filter.

6. The detection and network configuration system of claim 1, wherein the data processing device includes a wireless communication module, and wherein the wireless communication module is configured to operate as a LoRa end-node, a LoRaWAN end-node, a LoRa repeater mode, and a LoRa to LoRaWAN mode based on the received network protocol of the other data processing device.

7. The detection and network configuration system of claim 1, wherein the data processing device includes a power supply assembly configured to provide electrical power to the data processing device, the power supply assembly including a power source and a power management circuit, wherein the power source includes a rechargeable battery and a non-rechargeable battery, the rechargeable battery serves as a first power source until an energy level of the rechargeable battery reaches a predetermined limit according to the power management circuit, and the non-rechargeable battery serves as a second power source when the energy level is at the predetermined limit.

8. A detection and network configuration method, the method comprising:

receiving a plurality of synchronization and mapping messages from a plurality of data processing devices and a plurality of network gateways over a network for a predetermined period of time, wherein the plurality of data processing devices are configured in a mesh topology;

determining a network architecture based upon the plurality of synchronization and mapping messages, the network architecture including:

a plurality of modes of operation of the respective data processing devices;

a plurality of frequency channels for the plurality of data processing devices for transmission of environmental data;

an optimization path; and an identity of the respective data processing devices for transmission to another data processing device; and communicating the network architecture to the plurality of data processing devices over the network;

the data processing device automatically selecting a network protocol from a plurality of network protocols based on a location of the data processing device and/or a received network protocol received from the other data processing device;

providing, by the plurality of network gateways, a communication interoperability interface between the plurality of network protocols;

wherein the plurality of network protocols includes any one or more of a LoRa (Long Range) network protocol and a LoRaWAN (Long Range Wide Area Network) network protocol, and wherein the environmental data relates to the presence or absence of a wildfire;

transmitting data in a time synchronization by the plurality of data processing devices and the plurality of network gateways, wherein the time synchronization includes reduced idle listening;

transmitting data on each of the plurality of frequency channels by the plurality of data processing devices and the plurality of network gateways.

9. The detection and network configuration method of claim 8, wherein the time synchronization further includes any one or more of duty cycling, time-slotted communication, coordinated sensing, and power-efficient routing.

10. The detection and network configuration method of claim 8, wherein the data processing device includes:

a sensor assembly, wherein the sensor assembly includes a plurality of sensors configured to detect the environmental data, the environmental data relating to any one or more of carbon dioxide, carbon monoxide, nitrogen dioxide, temperature, and humidity, wherein the sensor assembly includes a filter configured to improve measurement accuracy;

a power supply assembly configured to provide electrical power to the data processing device, the power supply assembly including a power source and a power management circuit, wherein the power source includes a rechargeable battery and a non-rechargeable battery, the rechargeable battery serves as a first power source until an energy level of the rechargeable battery reaches a predetermined limit according to the power management circuit, and the non-rechargeable battery serves as a second power source when the energy level is at the predetermined limit.

11. The detection and network configuration method of claim 10, wherein the filter is configured as a bandpass filter or a neutral density filter.

12. The detection and network configuration method of claim 10, wherein the filter is configured as a chemical filter or a particulate filter.

13. The detection and network configuration method of claim 8, wherein the data processing device includes a wireless communication module, and wherein the wireless communication module is configured to operate as a LoRa end-node, a LoRaWAN end-node, a LoRa repeater mode, and a LoRa to LoRaWAN mode based on the received network protocol of the other data processing device.

14. A detection and network configuration system comprising:
- a plurality of client systems;
- a plurality of data processing devices configured in a mesh topology;
- a network configuration server communicatively connected to the plurality of client systems and the plurality of data processing devices, the network configuration server comprising:
  - a hypervisor configured to supervise a plurality of virtual machines and merge environmental data from the plurality of data processing devices, wherein merging the environmental data includes performing one or more of pre-processing, altering, compressing, or post-processing the environmental data;
  - a hardware layer;
  - an infrastructure layer configured to provide infrastructure as a service (IaaS);
  - a platform layer configured to provide platform as a service (PaaS); and
  - an application layer configured to provide access to an application software;
  - a processor; and
  - a memory communicatively connected with the at least one processor, the memory storing computer-executable instructions thereon that, when executed by the processor, cause the network configuration server to:
    - receive a plurality of synchronization and mapping messages from the plurality of data processing devices and a plurality of network gateways over a network for a predetermined period of time;
    - determine a network architecture based upon the plurality of synchronization and mapping messages, the network architecture including:
      - a plurality of modes of operation of the plurality of data processing devices;
      - a plurality of frequency channels for the plurality of data processing devices for transmission of the environmental data;
      - an optimization path; and
      - an identity of a data processing device for transmission to another data processing device; and
    - communicate the network architecture to the plurality of data processing devices over the network;
- the plurality of network gateways configured to provide a communication interoperability interface between the plurality of network protocols;
- a network server for providing network services including data processing, storage, application and device management, and resource sharing, the network server connected to the plurality of network gateways; and
- wherein the plurality of network protocols includes any one or more of a LoRa (Long Range) network protocol and a LoRaWAN (Long Range Wide Area Network) network protocol, and wherein the environmental data relates to the presence or absence of a wildfire;
- wherein the data processing device automatically selects a network protocol from the plurality of network protocols based on a location of the data processing device and/or a received network protocol received from the other data processing device;
- wherein the plurality of data processing devices and the plurality of network gateways are configured to transmit data in a time synchronization, and wherein the time synchronization includes reduced idle listening;
- wherein the plurality of data processing devices and the plurality of network gateways are configured to transmit data on each of the plurality of frequency channels.

15. The detection and network configuration system of claim 14, wherein the time synchronization further includes any one or more of duty cycling, time-slotted communication, coordinated sensing, and power-efficient routing.

16. The detection and network configuration system of claim 14, wherein the data processing device includes:
- a sensor assembly, wherein the sensor assembly includes a plurality of sensors configured to detect the environmental data, the environmental data relating to any one or more of carbon dioxide, carbon monoxide, nitrogen dioxide, temperature, and humidity, and wherein the sensor assembly includes a filter configured to improve measurement accuracy; and
- a power supply assembly configured to provide electrical power to the data processing device, the power supply assembly including a power source and a power management circuit, wherein the power source includes a rechargeable battery and a non-rechargeable battery, the rechargeable battery serves as a first power source until an energy level of the rechargeable battery reaches a predetermined limit according to the power management circuit, and the non-rechargeable battery serves as a second power source when the energy level is at the predetermined limit.

17. The detection and network configuration system of claim 16, wherein the filter is configured as a bandpass filter or a neutral density filter.

18. The detection and network configuration system of claim 16, wherein the filter is configured as a chemical filter or a particulate filter.

19. The detection and network configuration system of claim 14 wherein the data processing device includes a wireless communication module, and wherein the wireless communication module is configured to operate as a LoRa end-node, a LoRaWAN end-node, a LoRa repeater mode, and a LoRa to LoRaWAN mode based on the received network protocol of the other data processing device.

* * * * *